(12) United States Patent
Magee et al.

(10) Patent No.: US 7,212,175 B1
(45) Date of Patent: May 1, 2007

(54) SYMBOL POSITION MONITORING FOR PIXELATED HEADS-UP DISPLAY METHOD AND APPARATUS

(75) Inventors: Patrick L. Magee, Portland, OR (US); Richard S. Arlint, Yacolt, WA (US); Thomas E. Hodel, Sherwood, OR (US); David L. Wallac, West Linn, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 505 days.

(21) Appl. No.: 10/666,473

(22) Filed: Sep. 19, 2003

(51) Int. Cl.
*G09G 5/00* (2006.01)
*G08B 21/00* (2006.01)

(52) U.S. Cl. .................. 345/7; 340/945; 345/690

(58) Field of Classification Search ........... 345/7–9, 345/690, 88, 501–506, 519–520, 522, 904; 348/180–194; 714/38, 32, 46, 735; 701/14; 340/945
See application file for complete search history.

(56) References Cited

U.S. PATENT DOCUMENTS

| | | | | |
|---|---|---|---|---|
| 4,541,066 A | * | 9/1985 | Lewandowski | 702/117 |
| 4,698,785 A | * | 10/1987 | Desmond et al. | 714/38 |
| 5,335,177 A | * | 8/1994 | Boiteau et al. | 701/14 |
| 6,281,810 B1 | * | 8/2001 | Factor | 340/971 |
| 6,693,558 B2 | * | 2/2004 | Hedrick | 340/971 |
| 2004/0046712 A1 | * | 3/2004 | Naimer et al. | 345/9 |

* cited by examiner

*Primary Examiner*—Amr A. Awad
*Assistant Examiner*—Stephen G Sherman
(74) *Attorney, Agent, or Firm*—Nathan O. Jensen; Kyle Eppele

(57) ABSTRACT

An information processing system is disclosed. The information processing system includes a first processor that receives input data and creates a pixel data stream provided over a first channel and a second channel. The first channel provides a signal to affect the output of a pixelated display. The second channel includes location information and symbol information. The information processing system also includes a second processor coupled to the first processor. The second processor receives the location information and the symbol information from the first processor. The second processor receives the input data. The second processor computes a derived version of the inputs based on the location information and the symbol information.

22 Claims, 2 Drawing Sheets

SYMBOL POSITION MONITORING FOR PIXELATED HEADS-UP DISPLAY METHOD AND APPARATUS

BACKGROUND

The invention relates generally to control systems, and more particularly to a digital control data processing and display method and apparatus which verifies symbol positioning accuracy by receiving the positioning of a blue pixel on an LCD or other pixelated display, computing derived input information based on detected symbol position and symbol type and comprising the desired input information to the actual input information.

Conventionally, methods and apparatus for verifying the operational status of digital control systems, specifically for flight guidance applications, have been used. For example, there have been known control system apparatuses which project a display symbol in the form of a light image that conveys information concerning the status of an operational state of the system. Such display symbols include pointers and other characters whose position on or direction of movement across the display screen conveys to the observer information about a particular operational state.

Further, a conventional apparatus for determining whether a display symbol conveys the correct information includes the use of a test program which is executed while the control system is off-line. The test program applies known input information to the data processing apparatus which produces output command information in accordance with a known operational control function. A display symbol generator responds to the output command information by projecting a preassigned pointer symbol at a known location on the display screen. A photo detector positioned at the known location receives the light emitted from the pointer symbol and thereby acknowledges the nominal performance of the control system after a successful execution of the test program.

These methods of verifying the operational status of the control data processing and display system are capable of neither verifying the status of the system in real time operation nor providing an adequate test for detecting latent software design defects which arise during the execution of a particular control operational function.

Thus, there is a need for a symbol position and location monitoring system which may be used during flight operations.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An example of the invention relates to an information processing system. The information processing system includes a first processor that receives input data and creates a pixel data stream provided over a first channel and a second channel. The first channel provides a signal to affect the output of a pixelated display. The second channel includes location information and symbol information. The information processing system also includes a second processor coupled to the first processor. The second processor receives the location information and the symbol information from the first processor. The second processor receives the input data. The second processor computes a derived version of the inputs based on their location information and the symbol information.

Another example of the invention relates to a method of providing integrity checking for a pixelated display device. The method includes receiving input data by a first processor. The method also includes generating drawing instructions for a graphics engine. Further, the method includes outputting pixel data to a detector. Further still, the method includes receiving, by a display, at least some of the pixel data over a first channel. Yet further still, the method includes receiving over a second channel, by a symbol monitor, at least some of the pixel data and receiving the input data by the symbol monitor.

Yet another example of the invention relates to an information processing system. The information processing system includes a first processing means that receives input data and creates a pixel data stream provided over a first channel and a second channel. The first channel provides a signal to affect the output of a pixelated display and the second channel includes location information and symbol information. The information processing system also includes a second processing means coupled to the first processing means. The second processing means receives the location information and the symbol information from the first processing means and the second processing means receives the input data. The second processing means computes a derived version of the inputs based on the location information and the symbol information.

Alternative examples and other exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
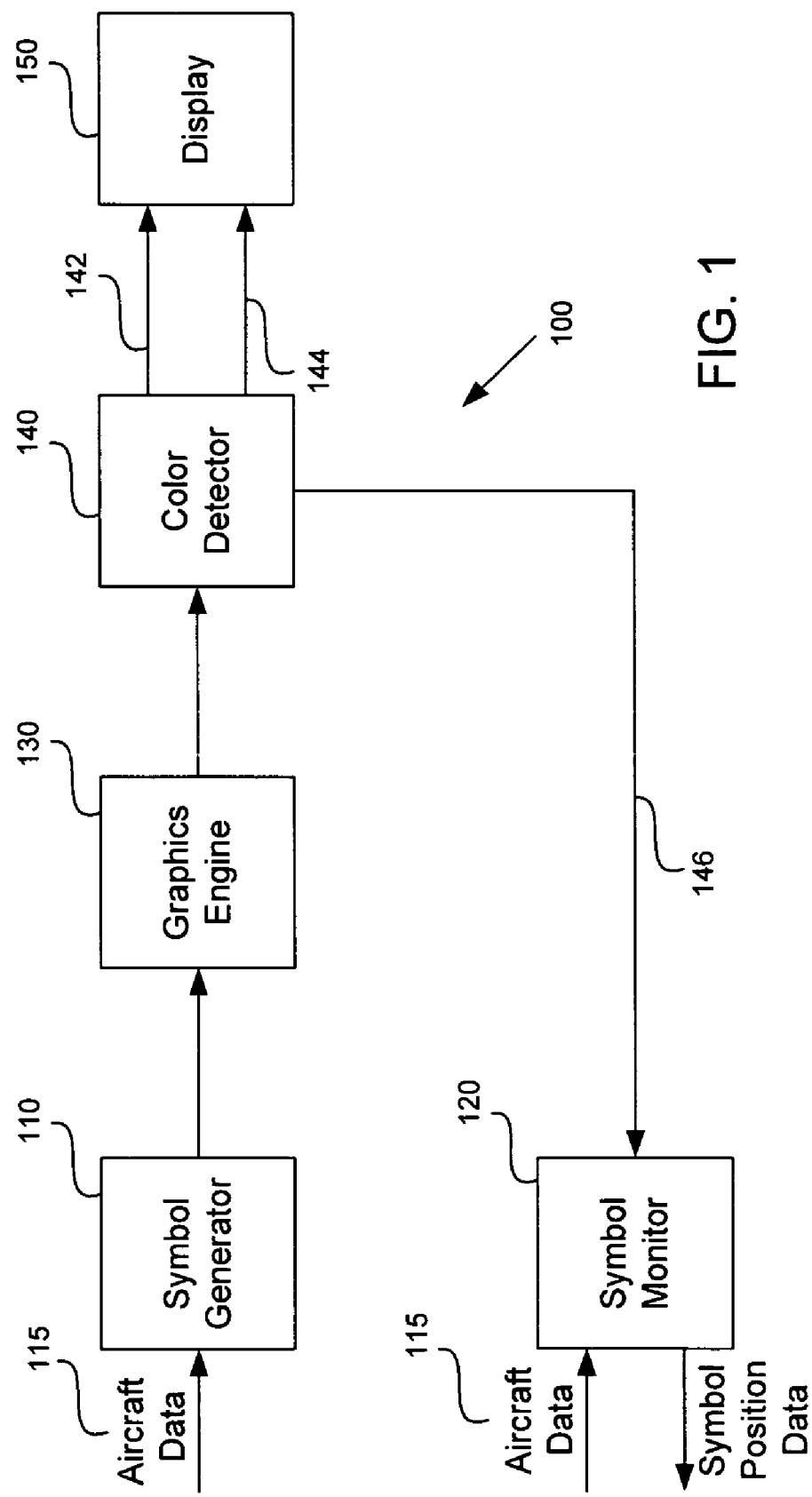
FIG. 1 is a generalized block diagram of an exemplary symbol monitoring positioning system for a heads-up display (HUD) with a pixelated display.

Before describing in detail the particular improved system and method, it should be observed that the invention includes, but is not limited to a novel structural combination of conventional data/signal processing components and communications circuits, and not in particular detailed configurations thereof. Accordingly, the structure, methods, functions, control, and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring now to FIG. 1, an exemplary control data processing system 100 is depicted. A symbol generator 110 receives aircraft data 115 from a plurality of sensor inputs and other system input data which may be delivered in either analog or digital form to both symbol generator 110 and to symbol monitor 120. According to an exemplary embodiment, aircraft data 115 may comprise aircraft sensor data. In accordance with alternative embodiments, aircraft data 115 may include but is not limited to any variety of sensor signals including the position of aerodynamic control surfaces, environmental variables affecting the flight of the aircraft, and/or the operating conditions and status of the pilot's controls. Analog data are converted into digital word format by analog-to-digital converters either included in or outside of symbol generators 110 and symbol monitor 120.

When receiving aircraft data 115, symbol generator 110 creates a display list containing drawing instructions for the graphics engine 130. A conventional graphics engine 130 is capable of displaying the three primary colors (red, green, and blue) with multiple, independent intensities. In a conventional HUD, only the colors red and green are used. Accordingly, the blue color may be used to carry additional information. Graphics engine 130 processes the display list that is received from symbol generator 110 and produces, as output, a stream of pixel data to a color detector 140. Color detector 140 passes the red data over path 142 and the green data over path 144 to a display 150 and blue data over path 146 to symbol monitor 120. Display 150 may be any variety of pixilated displays, including, but not limited to a liquid crystal display (LCD). Further, display 150 may be a heads-up or a heads-down display although the disclosure describes primarily the use of display 150 in a heads-up display configuration. Certain symbols passed to display 150 may be characterized as "critical symbols" that are critical to the operation of the aircraft, are necessary for critical operations of the aircraft, and/or are identified as such through certification standards. Each critical symbol has associated with it, and X, Y display position, as well as a unique identifier or tag that identifies the type of symbol being displayed. The symbol generator 110 places instructions in a display list to locate the symbol in the correct X and Y position in the blue pixel buffer of graphics engine 130. The intensity level associated with the symbol is the symbol's identifier or tag. Accordingly, the number of identifiers is limited only by the number of blue pixel intensity values and/or by the number of states of intensity that color detector 140 can detect.

Color detector 140 processes the stream of pixel data from graphics engine 130 and sends red and green pixel data to display 150 over paths 142 and 144. Blue pixel X and Y positions are detected by the color detector 140 and stored for access by symbol monitor 120 over path 146. Symbol monitor 120 provides verification that the symbols displayed are placed in the proper location and/or are the correct symbol. Each blue pixel intensity is used to uniquely identify the symbol being used. Symbol monitor 120 may also determine which symbol is being drawn and where it is being drawn from the information received from color detector 140. Symbol monitor 120 reads the detector symbol position data from color detector 140 and uses the data to determine what sensor input value is required to position the symbol in that unique position. The sensor input values are produced through an inverse processing process. The inverse processing may be a matrix inversion for linear processes or an inverse function for linear or nonlinear relationships. Symbol monitor 120 compares the computed value with the actual input sensor data 115. If a miscompare is computed between display data from graphics engine 130 and the actual aircraft data 115, then a display path error exists, and the display is blanked of the symbol. Further, in an exemplary embodiment, symbol monitor 120 also transmits the symbol position data to test equipment external to the heads up guidance system (HGS).

In an alternative embodiment, the display using three colored graphics, such as a heads down display, may utilize a fourth monitoring channel to a normal three-color graphics engine which would be similar to the blue channel used in the two-color graphics system described. Further, according to alternative embodiments, the invention which may be used in HGS for aircraft may also be employed in other environments such as, but not limited to automobiles or other vehicle systems. Such a system may be beneficial in autonomous vehicle control systems. Further, the invention may be employed in other environments in which symbol display errors cannot be tolerated, such as but not limited to a surgical application in which a display is being used for the guidance of a surgical device, such as, but not limited to a guided probe. Also, in accordance with an alternative embodiment, a non-pixelated display may be used as pixel data may be converted to whatever format is used by the particular display type.

Symbol monitor 120 may be an independent symbol monitor processor, that runs a dissimilar algorithm, and computes the state of the aircraft based on the position of the critical symbols. The independent symbol monitor processor 120 also compares the computed aircraft state with the measured aircraft data 115 to determine if a display path fault has occurred. If no miscompare exists, the display path is determined to be good, and the high integrity information is displayed to the pilot.

In critical applications it is desirable for the display of information, such as attitude, on a HUD to meet a $10^{-7}$ integrity requirement. Further, it may be desirable for the display of misleading guidance on a single HUD must be less than $10^{-9}$. Further, in certain applications, the HUD display path must be monitored in order to meet these integrity requirements. Accordingly, the invention disclosed may be applied to achieve such goals. Further, the HUD symbol position monitoring system as described, may be used in conjunction with other monitoring schemes to verify that displayed symbology is not misleading and thus meets the certification integrity requirements. These requirements may be applicable for landing, take off, and other flight regimes.

Figure 2:
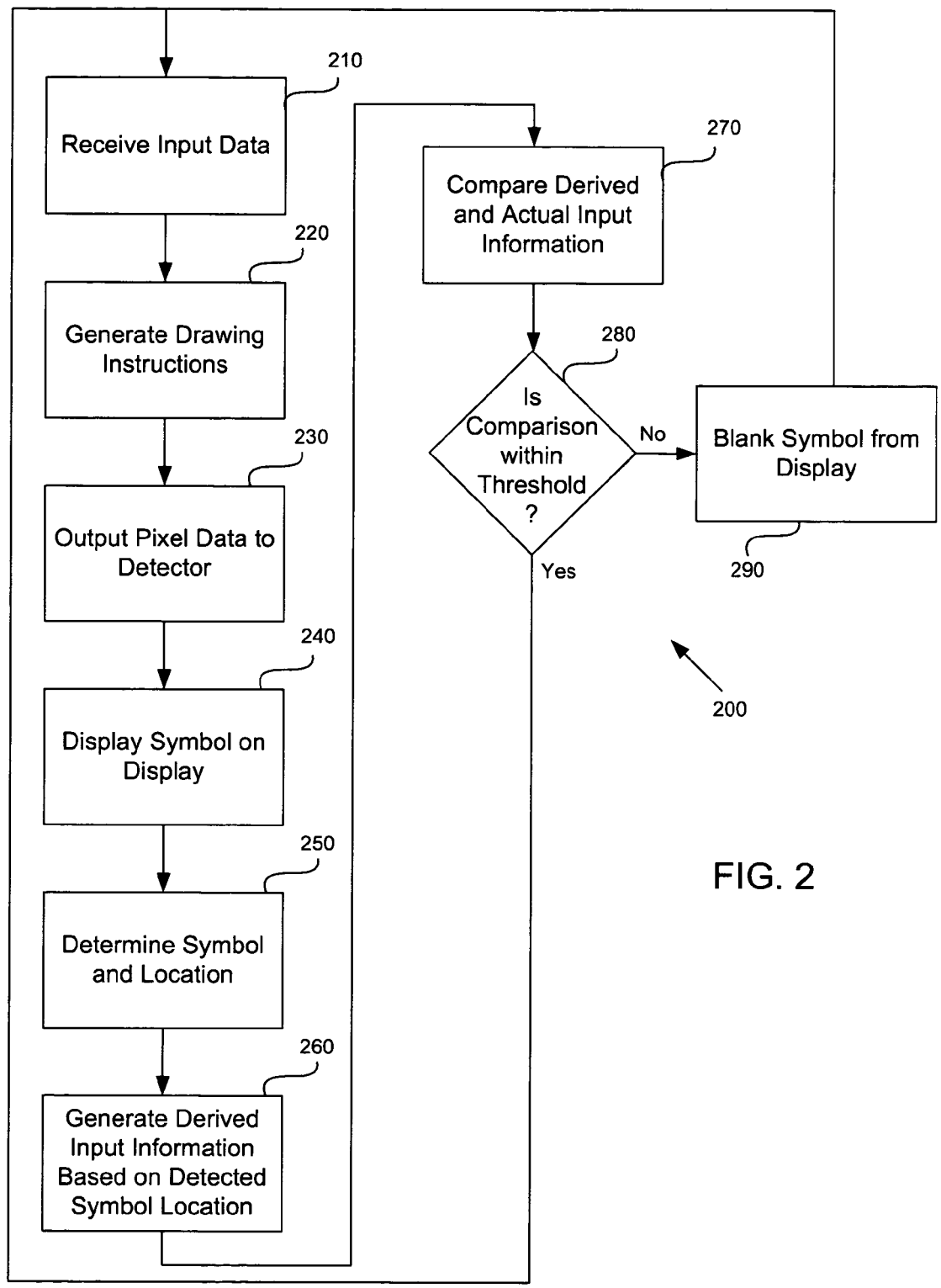
FIG. 2 is an exemplary method of providing symbol positioning monitoring for a heads-up display with a pixelated display.

Referring now to FIG. 2, a process 200 is depicted for providing integrity checking for a pixelated display device. Process 200 begins by receiving input data from a plurality of aircraft sensors and/or systems (step 210). Drawing instructions are then generated based on the input data (step 220). Such instructions provide both the location and type of symbol to be drawn on the pixelated display. The pixel data is then output to a detector (step 230). The detector passes through a subset of the data to the display for drawing thereon (step 240). The detector then determines the symbol and its location (step 250). From the symbol and location detected, derived input information is generated by a second processing device. The derived input information is then compared with actual input information to determined whether it is within a tolerable threshold (step 280). If the derived and actual input information are not within a specified threshold, the symbol is then determined to be in error and certain actions can be taken such as blanking the symbol from the display (step 290), blanking the entire display, and/or sending a warning signal of any type such as an aural, and/or visual warning, or the like, to the pilot. This process is carried out continuously during the flight of the aircraft or it may be implemented during certain critical flight segments such as, but not limited to take off and landing.

While the detailed drawings, specific examples and particular formulations given described preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. An information processing system, comprising:
   a symbol generator for receiving input data and creating a display list containing drawing instructions;
   a graphics engine for receiving the display list containing drawing instructions and producing a pixel data stream;
   a color detector for receiving the pixel data stream and passing red pixel data over a red path, green pixel data over a green path, and blue pixel data over a blue path;
   a display for receiving only the red pixel data and the green pixel data and displaying the red pixel data and green pixel data as symbols; and
   a symbol monitor for receiving only the blue pixel data and the input data, for verifying that the symbols are placed in a proper location on the display, and for verifying the symbols are correct by comparing the blue pixel data and the input data.

2. The information processing system of claim 1, wherein the symbol generator provides drawing instructions for correct X and Y positions for the symbols and a unique identifier for a type of symbol to be displayed.

3. The information processing system of claim 2, wherein the symbol generator places the drawing instructions in a blue pixel buffer of the graphics engine.

4. The information processing system of claim 2, wherein the the unique identifier for a type of symbol is an intensity level of the blue pixel data.

5. The information processing system of claim 4, wherein the color detector detects and stores blue pixel X and Y positions and the intensity level of the blue pixel data for access by the symbol monitor.

6. The information processing system of claim 5, wherein the symbol monitor identifies a symbol using the blue pixel intensity and determines where the symbol is being drawn on the display from detected symbol position data from the color detector.

7. The information processing system of claim 6, wherein the symbol monitor uses the detected symbol position data from the color detector to determine what data input value positions the symbol in a unique location.

8. The information processing system of claim 7, wherein the symbol monitor processes the detected symbol position data and compares the processed symbol position data with the input data.

9. The information processing system of claim 8, wherein if a miscompare between the processed symbol position data and the input data occurs the symbol is blanked on the display.

10. A method of providing integrity checking for a pixelated display device, comprising the steps of:
    receiving input data by a symbol generator;
    generating drawing instructions with the symbol generator for a graphics engine;
    outputting pixel data from the graphics engine to a color detector;
    receiving, by a display, only red and green pixel data from the color detector;
    displaying a symbol using the red and green pixel data;
    receiving, by a symbol monitor, only the blue pixel data from the color detector;
    receiving the input data by the symbol monitor; and
    comparing the blue pixel data with the input data for verifying the symbols are correct.

11. A method of claim 10, further comprising:
    generating derived input information based on the blue pixel data.

12. The method of claim 11, further comprising:
    comparing the derived input information with the input data.

13. The method of claim 12, further comprising:
    issuing an error warning if the comparison is not within a predefined threshold.

14. The method of claim 10, further comprising:
    identifying, with the symbol monitor, a symbol using a blue pixel intensity; and
    determining where the symbol is being drawn with data from the color detector.

15. A pixilated display system with symbol position monitoring, comprising:
    a symbol generator receiving input data and creating a display list containing drawing instructions;
    a graphics engine for receiving the display list containing drawing instructions and for producing a pixel data stream;
    a color detector for receiving the pixel data stream and passing red pixel data and green pixel data and detecting and storing only blue pixel data for providing symbol location information and symbol identification;
    a display for receiving only the red and green pixel data and displaying a symbol therefrom;
    a symbol monitor coupled to the color detector, the symbol monitor receiving the symbol location information and the symbol identification from the color detector and the symbol monitor receiving the input data, computing derived input information based on the symbol location information and the symbol identification, and comparing the input data to derived input information.

16. The pixilated display of claim 15, if a miscompare between the derived input information and the input data occurs the symbol is blanked on the display.

17. The pixilated display of claim 15, wherein an intensity level of the blue pixel data provides symbol identification.

18. The pixilated display of claim 15, wherein the symbol generator provides drawing instructions for correct X and Y position for the symbol and a unique identifier for the symbol.

19. The pixilated display of claim 18, wherein the unique identifier for the symbol is an intensity level of the blue pixel data.

20. The pixilated display of claim 15, wherein the input data comprises aircraft sensor data.

21. The pixilated display of claim 15, wherein the input data comprises aircraft control surface data.

22. The pixilated display of claim 15, wherein the derived version is computed using a matrix inversion process.

* * * * *